(12) United States Patent
Toyomura et al.

(10) Patent No.: US 7,733,069 B2
(45) Date of Patent: Jun. 8, 2010

(54) POWER CONVERTING APPARATUS AND POWER GENERATING APPARATUS

(75) Inventors: Fumitaka Toyomura, Nara (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 1398 days.

(21) Appl. No.: 09/963,569

(22) Filed: Sep. 27, 2001

(65) Prior Publication Data
US 2002/0044473 A1    Apr. 18, 2002

(30) Foreign Application Priority Data

Sep. 29, 2000   (JP)   ............................. 2000-299974
Oct. 31, 2000   (JP)   ............................. 2000-333681

(51) Int. Cl.
*G05F 1/147*   (2006.01)
(52) U.S. Cl. ...................................... 323/256; 363/143
(58) Field of Classification Search ................... 363/15, 363/16, 55, 95, 143, 142; 323/247, 265, 323/266, 906, 255–258
See application file for complete search history.

(56) References Cited

U.S. PATENT DOCUMENTS

| | | | |
|---|---|---|---|
| 4,656,571 A | 4/1987 | Umezu | 363/37 |
| 4,915,639 A | 4/1990 | Cohn et al. | 439/188 |
| 5,185,536 A | 2/1993 | Johnson, Jr. et al. | 307/66 |
| 5,260,864 A | 11/1993 | Simonelli et al. | 363/143 |
| 5,262,935 A | 11/1993 | Shirahama et al. | 363/71 |
| 5,334,877 A | 8/1994 | Mohan et al. | 307/46 |
| 5,426,579 A | 6/1995 | Paul et al. | 363/126 |
| 5,548,504 A | 8/1996 | Takehara | 363/65 |
| 5,592,074 A | 1/1997 | Takehara | 363/131 |
| 5,602,462 A | 2/1997 | Stich et al. | 323/258 |
| 5,612,580 A | 3/1997 | Janonis et al. | 307/64 |
| 5,616,968 A | 4/1997 | Fujii et al. | 307/66 |
| 5,621,300 A | 4/1997 | Sato et al. | 320/5 |
| 5,669,987 A | 9/1997 | Takehara et al. | 136/244 |
| 5,670,833 A | 9/1997 | Mengelt et al. | 307/66 |
| 5,714,869 A | 2/1998 | Tamechika et al. | 320/30 |
| 5,715,156 A | 2/1998 | Yilmaz et al. | 363/142 |
| 5,751,133 A | 5/1998 | Sato et al. | 320/13 |

(Continued)

FOREIGN PATENT DOCUMENTS

DE   3637669   5/1988

(Continued)

OTHER PUBLICATIONS

Official Action dated Mar. 2, 2009 in Japanese Application No. 2000-299974.

(Continued)

*Primary Examiner*—Jessica Han
(74) *Attorney, Agent, or Firm*—Fitzpatrick, Cella, Harper & Scinto

(57) ABSTRACT

AC module makers must prepare two types of AC modules for the 100-V and 200-V outputs only for domestic supply. For foreign countries, the makers must manufacture AC modules compatible with more system voltages. To solve these problems, the control circuit of an AC module controls the operation of an inverter circuit and/or the transformation ratio of a transforming circuit, and ON/OFF-controls a switch on the basis of the system voltage and connection state of an electric power system.

9 Claims, 16 Drawing Sheets

U.S. PATENT DOCUMENTS

| | | | |
|---|---|---|---|
| 5,760,495 A | 6/1998 | Mekanik | 307/66 |
| 5,777,396 A | 7/1998 | Kikuchi | 307/112 |
| 5,790,391 A | 8/1998 | Stich et al. | 363/24 |
| 5,825,164 A * | 10/1998 | Williams | 323/255 |
| 5,869,956 A | 2/1999 | Nagao et al. | 323/299 |
| 5,886,890 A | 3/1999 | Ishida et al. | 363/71 |
| 5,892,354 A | 4/1999 | Nagao et al. | 323/299 |
| 5,923,158 A | 7/1999 | Kurokami et al. | 323/299 |
| 5,955,885 A | 9/1999 | Kurokami et al. | 324/426 |
| 5,973,948 A | 10/1999 | Hahn et al. | 363/146 |
| 5,977,659 A | 11/1999 | Takehara et al. | 307/85 |
| 5,986,354 A | 11/1999 | Nagao et al. | 307/64 |
| 5,995,400 A * | 11/1999 | Park et al. | 363/146 |
| 6,058,035 A | 5/2000 | Madenokouji et al. | 363/95 |
| 6,101,073 A | 8/2000 | Takehara | 361/42 |
| 6,111,769 A | 8/2000 | Zhang et al. | 363/127 |
| 6,207,896 B1 | 3/2001 | Toyomura | 174/58 |
| 6,278,052 B1 | 8/2001 | Takehara et al. | 136/244 |
| 6,320,769 B2 | 11/2001 | Kurokami et al. | 363/56.03 |
| 6,448,489 B2 * | 9/2002 | Kimura et al. | 363/95 |
| 6,803,707 B2 | 10/2004 | Ishiwata et al. | 313/310 |
| 2004/0027902 A1 | 2/2004 | Ooishi et al. | 365/222 |

FOREIGN PATENT DOCUMENTS

| | | |
|---|---|---|
| EP | 0409226 | 1/1991 |
| EP | 0652631 | 5/1995 |
| EP | 0712200 | 5/1996 |
| EP | 718952 | 6/1996 |
| EP | 0817350 | 1/1998 |
| EP | 0 942 519 A1 | 9/1999 |
| JP | 58-069470 | 4/1983 |
| JP | 02-144268 | 12/1990 |
| JP | 05-336653 | 12/1993 |
| JP | 08-080060 | 3/1996 |
| JP | 08-182202 | 7/1996 |
| JP | 09-054623 | 2/1997 |
| JP | 09-135577 | 5/1997 |
| JP | 09-135578 | 5/1997 |
| JP | 09-140157 | 5/1997 |
| JP | 09-163610 | 6/1997 |
| JP | 09-163626 | 6/1997 |
| JP | 09-322557 | 12/1997 |
| JP | 10-14111 | 1/1998 |
| JP | 100-14258 | 1/1998 |
| JP | 100-23671 | 1/1998 |
| JP | 11-122818 | 4/1999 |
| JP | 11-282556 | 10/1999 |
| JP | 2000-69677 | 3/2000 |
| JP | 2000-134825 | 5/2000 |
| JP | 2000-152651 | 5/2000 |
| JP | 2000-197268 | 7/2000 |

OTHER PUBLICATIONS

Parker, Sybil P. (Ed.), McGraw-Hill Dictionary of Scientific and Technical Terms, Fifth Edition, New York: McGraw Hill Book Company, 1994, p. 652.

Japanese Office Action dated May 25, 2009, from corresponding Japanese Application No. 2000-299974.

* cited by examiner

US 7,733,069 B2

POWER CONVERTING APPARATUS AND POWER GENERATING APPARATUS

FIELD OF THE INVENTION

The present invention relates to a power converting apparatus and power generating apparatus and, more particularly, to a power converting apparatus such as an inverter connectable to an electric power system and a power generating apparatus for converting a power outputted from a direct current power supply unit such as a solar battery or storage battery into alternating current power by a power converting apparatus and supplying the alternating current power to a load or electric power system.

BACKGROUND OF THE INVENTION

In recent years, many solar power generation apparatuses for converting direct current power generated by a solar battery into alternating current power by an inverter and supplying the alternating current power to a load in a house (to be simply referred to as a "load" hereinafter) and/or a commercial electric power system (to be simply referred to as a "system" hereinafter) are installed to deal with environmental problems.

These solar power generation apparatuses have also received a great deal of attention as emergency power supplies to be used in the event of disasters such as an earthquake. Even when power outage occurs due to an earthquake, system failure, or maintenance, many recent solar power generation apparatuses can be disconnected from systems and supply a power to loads by isolated operation.

AC modules have also received a great deal of attention as small- or medium-scale solar power generation apparatuses or emergency power supplies, which allow a single solar battery module to output alternating current power by attaching, to, e.g., the lower surface of a solar battery module, a small inverter called a MIC (Module Integrated Converter) for converting direct current power generated by a solar battery into alternating current power.

As disclosed in Japanese Patent Laid-Open No. 10-14111, an AC module is connected to the neutral line and one power line of a single-phase three-wire unit and then connected to a system. In an emergency, a solar power generation apparatus using an AC module uses alternating current power obtained by converting direct current power stored in a storage battery by an emergency inverter.

An AC module is connected to a system in a building through a panel board or the like. In Japan, the voltage of a system in a building is 100 V or 200 V, and an AC module must select a 100-V output or 200-V output in accordance with the connection. Hence, AC module makers must prepare two types of modules for the 100-V and 200-V outputs for domestic supply. For foreign countries, the makers must manufacture AC modules compatible with more system voltages.

If the output voltage changes in switching from interconnected operation to isolated operation, an easier switching method is required for an emergency power supply. Especially in disasters or the like, an AC module need be carried to an arbitrary position together with a load and easily output a desired voltage.

SUMMARY OF THE INVENTION

The present invention has been made to solve the above-described problems individually or altogether, and has as its object to make a power converting apparatus easily cope with many types of system voltages.

It is another object of the present invention to set the output voltage of a power converting apparatus in accordance with a system voltage.

It is still another object of the present invention to easily move and install a power converting apparatus in an emergency.

In order to achieve the above objects, according to a preferred aspect of the present invention, a power converting apparatus which is connected to an electric power system, the apparatus comprising: a converting circuit, arranged to convert direct current power to alternating current power; a transforming circuit, arranged to transform voltage outputted from the converting circuit; a switch, arranged to make/break connection between the transforming circuit and the electric power system; and a controller, arranged to control operation of the converting circuit and transforming circuit, and connection of the switch based on a line voltage of the electric power system and/or a connection state between the apparatus and the electric power system is disclosed.

In addition, a power converting apparatus which is connected to an electric power system, the apparatus comprising: a converting circuit, arranged to convert direct current power to alternating current power; a transforming circuit, arranged to transform voltage outputted from the converting circuit; a switch, arranged to make/break connection between the transforming circuit and the electric power system; and a controller, arranged to control operation of the converting circuit and/or transforming circuit, and control connection of the switch based on a type of connector which is used to connection between the apparatus and the electric power system is disclosed.

Also, a power converting apparatus which is connected to an electric power system, the apparatus comprising: a converting circuit, arranged to convert direct current power to alternating current power; a switch, arranged to make/break connection between the converting circuit and the electric power system; and a controller, arranged to control operation of the converting circuit and connection of switch based on a type of connector which is used to connection between the apparatus and the electric power system is disclosed.

It is still another object to easily and reliably switch the output voltage of a power converting apparatus.

It is still another object to easily and reliably switch between interconnected operation and isolated operation.

In order to achieve the above objects, according to another preferred aspect of the present invention, a power converting apparatus for converting electric power comprising: a booster circuit, arranged to boost voltage of direct current power inputted from a direct current power supply; an inverter circuit, arranged to convert the direct current power, which is inputted from the booster circuit, to alternating current power; an output port, arranged to output the alternating power supplied from the inverter circuit; and a controller, arranged to control operation of the booster and inverter circuits based on a type of plug unit connected to the output port is disclosed.

In addition, a power converting apparatus for converting electric power comprising: a booster circuit, arranged to boost voltage of direct current power inputted from a direct current power supply; an inverter circuit, arranged to convert the direct current power, which is inputted from the booster circuit, to alternating current power; a first output port, arranged to output the alternating power supplied from the inverter circuit through a first switch; a second output port, arranged to output the alternating power supplied from the inverter circuit through a second switch; and a controller, arranged to control operation of the booster and inverter circuits, wherein the controller makes the first switch and breaks the second switch when the apparatus is operated and connected to an electric power system, and breaks the first switch and makes the second switch when the apparatus is operated and no connected to the electric power system, and the controller controls the operation of the booster and inverter circuits based on a connection state of the first or second output port is disclosed.

Other features and advantages of the present invention will be apparent from the following description taken in conjunction with the accompanying drawings, in which like reference characters designate the same or similar parts throughout the FIGURES thereof.

DETAILED DESCRIPTION OF THE PREFERRED EMBODIMENTS

A solar power generation apparatus according to an embodiment of the present invention will be described below in detail with reference to the accompanying drawings.

First Embodiment

[Direct Current Power Supply]

Any kind of direct current power supply for generating direct current power can be used, including a solar battery, fuel cell, storage battery, thermocouple, and plasma power generating unit.

A solar battery used in this embodiment is not particularly limited. As a photovoltaic element made of a silicon semiconductor, a single-crystal silicon solar battery, polysilicon solar battery, amorphous silicon solar battery, or the like can be used. As a photovoltaic element made of a compound semiconductor, a III-V compound solar battery, II-VI compound solar battery, I-III-VI compound solar battery, or the like can be used.

A desired number of solar batteries are connected in series and parallel, inserted between a surface protecting member such as a glass plate or weathering-resistance film and a lower surface reinforcing member such as a moistureproof protective sheet or steel plate, and fixed by a filler, thereby forming a solar battery module.

A solar battery module often has an output cable structure in which a terminal box for extracting power or an output cable having a waterproof connector at its distal end is attached to the non-light-receiving surface. A plurality of solar battery modules are connected by connecting terminal boxes using output cables or connecting waterproof connectors to each other, thereby constructing a solar battery array.

This embodiment can also be applied to an AC module formed by attaching an inverter for converting direct current power outputted from a solar battery module into alternating current power to the lower surface of the solar battery module or electrically and/or mechanically connecting the inverter to a terminal box.

Especially an AC module preferably easily switches between interconnected operation and isolated operation and preferably obtains a desired output voltage in the isolated operation mode.

[Boosting Circuit]

A boosting circuit boosts the voltage of direct current power outputted from a direct current power supply such as a solar battery to a voltage necessary for an inverter circuit. As a boosting circuit, a boosting chopper circuit, voltage doubler rectifying circuit, series- and parallel-connected chopper circuit, or the like can be used.

Figure 1:
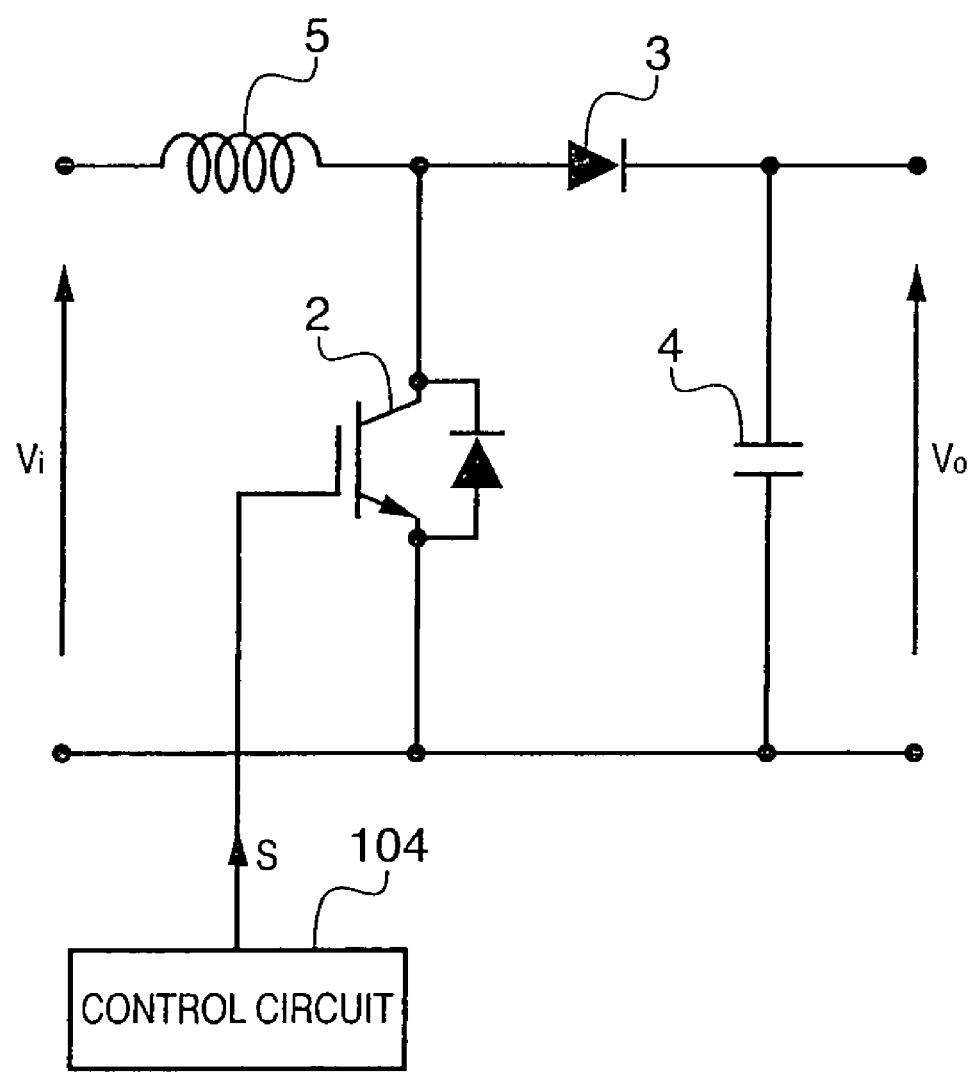
FIG. 1 is a view showing a boosting chopper circuit.

FIG. 1 is a view showing a boosting chopper circuit.

When a switching element 2 is turned on/off, the sum of an input voltage Vi and a voltage induced in a coil 5 can be stored in a capacitor 4 through a diode 3, thereby obtaining an output voltage Vo higher than the input voltage Vi. As the switching element 2, an IGBT or MOSFET is used.

The output voltage Vo of the boosting circuit is determined in accordance with the ratio of on/off periods (duty ratio) of a gate signal S inputted from a control circuit 104 to the switching element 2. The control circuit 104 controls the duty ratio of the gate signal S by a target boost voltage determined on the basis of the output voltage/current of a solar battery, the output voltage of an inverter, or the like.

[Inverter Circuit]

As an inverter circuit, a voltage-type inverter using an IGBT or MOSFET as a switching element is preferably used. The control circuit 104 supplies the gate signal to the inverter circuit to drive a plurality of switching elements, thereby obtaining desired output voltage and current. The inverter circuit is controlled to execute current control operation in a interconnected operation mode in which the apparatus is connected to a system and to execute voltage/frequency control operation in an isolated operation mode in which the apparatus is not connected to a system. These operations and control modes are known and disclosed in, e.g., Japanese Patent Laid-Open No. 58-69470, though they are not limited to those in this reference.

[Control Circuit]

Figure 2:
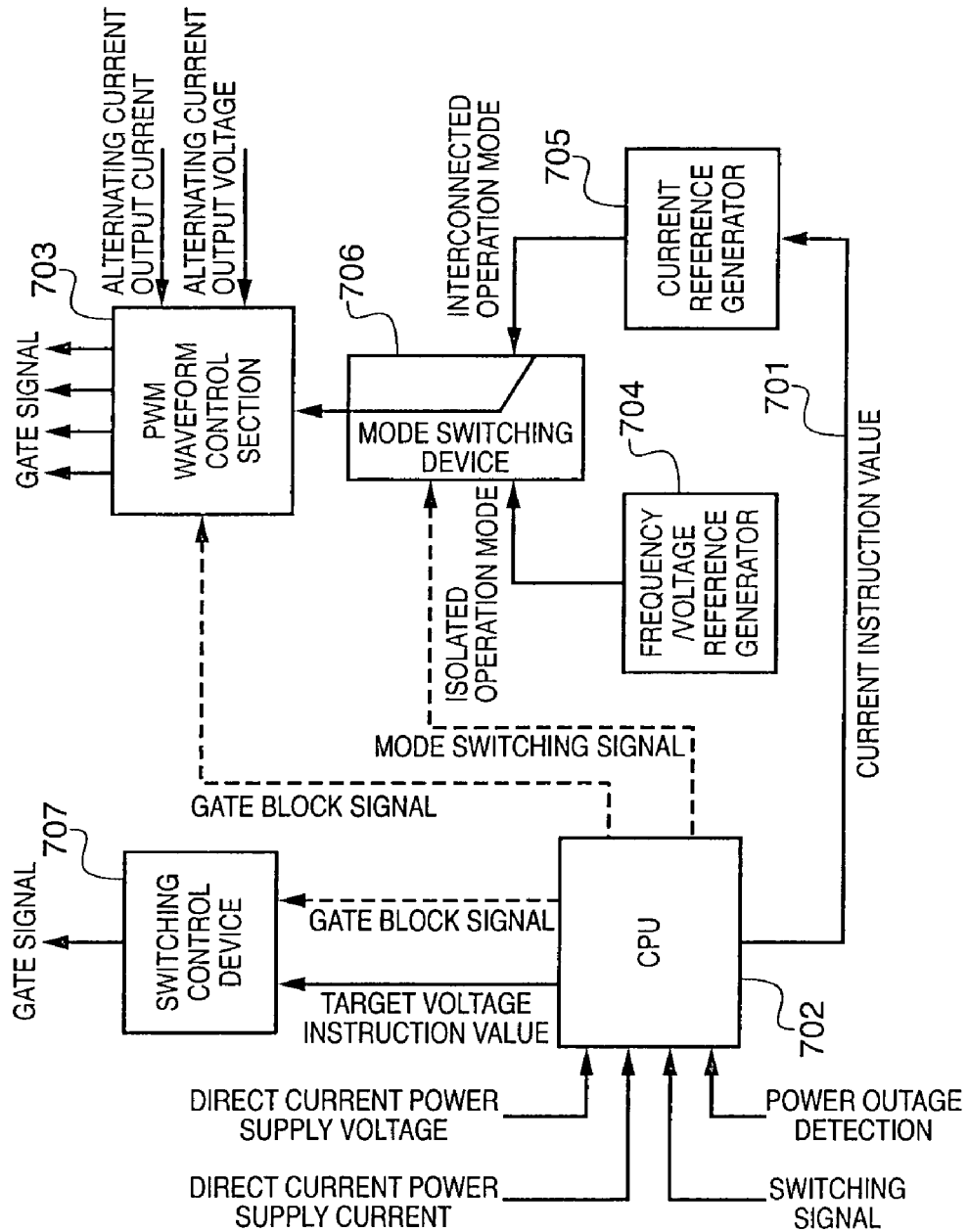
FIG. 2 is a block diagram showing the arrangement of a control circuit.

FIG. 2 is a block diagram showing the arrangement of the control circuit 104.

Referring to FIG. 2, a CPU 702 controls activation/stop and operation mode of the inverter. In the interconnected operation mode, the CPU 702 receives the output voltage and current from the solar battery and generates a target voltage instruction value and current instruction value. In the isolated operation mode, when the monitored output voltage of the solar battery has a predetermined value or less, the CPU outputs a gate block signal to stop the inverter. In a generating apparatus having a storage battery, a switch is changed over to convert direct current power obtained from the storage battery into alternating current power without stopping the inverter. In this case, the operation of the inverter is continued until the output voltage of the storage battery becomes a predetermined voltage or less.

A PWM waveform control section 703 receives a voltage reference value or current reference value and executes so-called feedback control to make the reference value match the output voltage or current, thereby generating a gate signal to be supplied to the switching elements of the inverter. Such a circuit is described in, e.g., Takao Hirasa, "Power Electronics" Kyoritu Shuppan. In this embodiment, a triangular wave comparison type PWM waveform generation circuit using a PI (proportion-integration) control system is used.

A frequency/voltage reference generator 704 is an oscillation circuit for generating a sine wave having a constant amplitude and constant frequency. As the frequency/voltage reference generator 704, a known circuit such as a Wien bridge circuit can be appropriately selected and used. In this embodiment, a sine wave oscillator is formed using an operational amplifier to generate a voltage reference signal.

A current reference generator 705 generates a sine wave (current reference signal) that has an amplitude corresponding to a current instruction value received from the CPU 702 and a phase almost matching a system voltage. Such a control circuit is disclosed in, e.g., Japanese Patent Laid-Open No. 58-69470, which comprises a multiplier, a transformer for receiving a system voltage, and the like. In this embodiment, a current reference signal is generated using a multiplier and transformer.

A mode switching device 706 selectively supplies, to the frequency/voltage reference generator 704, a current reference signal in the interconnected operation represented by a mode switching signal outputted from the CPU 702 or a voltage reference signal in the isolated operation mode. As the mode switching device 706, a relay or analog switch can be used. In this embodiment, a small relay is used.

A switching control section 707 outputs a gate signal to the boosting circuit on the basis of the target voltage instruction value outputted from the CPU 702. Hence, the output voltage Vo of the boosting circuit is controlled to the target voltage. In this embodiment, the switching control section 707 is formed using a comparator and multiplier.

As described above, the control circuit 104 preferably has a voltage/frequency reference used in the isolated operation mode and a current reference used in the interconnected operation mode and can preferably switch between them. The control circuit 104 may be externally operated through a communication line or communication path. The control circuit 104 itself may be arranged outside the inverter to systematically control a plurality of inverters.

The target value of the output voltage can be set in advance in the control circuit 104 or can be set using a dip switch or the like in accordance with the use condition of the inverter.

[Switch]

As a switch arranged in a panel board inserted between the inverter and the output terminal of the solar power generation apparatus or between the output terminal and a system, an electromagnetic switch or breaker can be used. For an electromagnetic switch, the ON/OFF operation is executed in accordance with, e.g., a signal inputted from the control circuit 104.

[Voltage and Current Detectors]

Voltage and current detectors are not particularly limited. As a current detector, a shunt resistor or current transformer is used. The terminal voltage of the shunt resistor or the output voltage of the current transformer is A/D-converted and inputted to the control circuit 104. As a voltage detector, a transformer or resistance potential divider is used. The output voltage of the transformer or resistance potential divider is A/D-converted and inputted to the control circuit 104. The voltage and current detectors can be either insulated or non-insulated from the main circuit.

First Example

Figure 3:
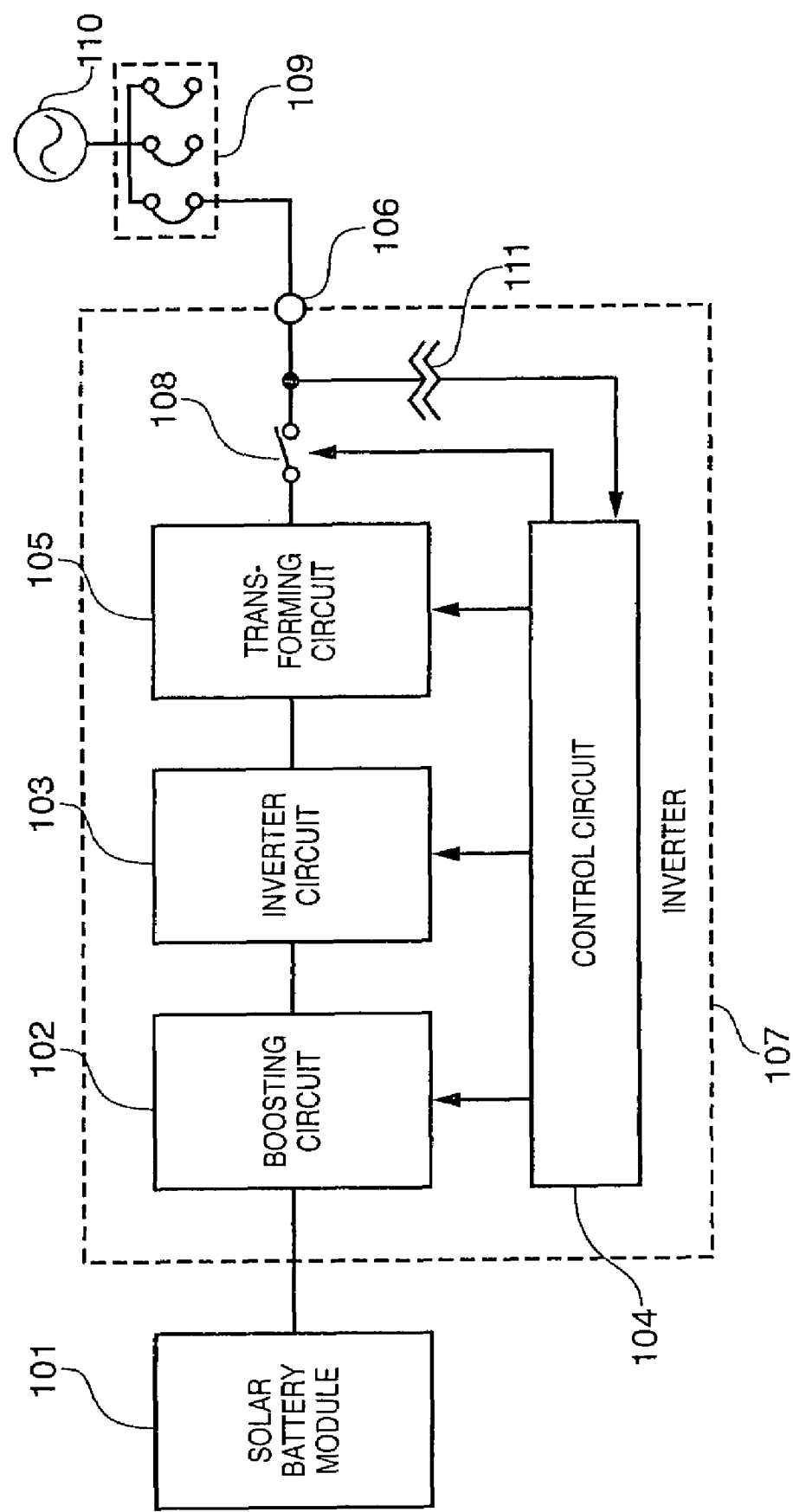
FIG. 3 is a block diagram showing the arrangement of a solar power generation apparatus of the first example.

FIG. 3 is a block diagram showing the arrangement of a solar power generation apparatus of the first example.

Referring to FIG. 3, direct current power generated by a solar battery module 101 is converted into alternating current power by an inverter 107 having a boosting circuit 102, inverter circuit 103, control circuit 104, transforming circuit 105, switch 108, output connector 106, and system voltage detector 111. The output from the inverter 107 is connected to a system 110 through a panel board 109.

As the solar battery module 101, a solar battery module PV-MR140 (rated power: 140 W, 19.6 V, 7.15 A) available from Mitsubishi Electric is used. Although a stand-alone solar battery module can be used, a plurality of solar battery modules may be connected to form a solar battery array. The number of solar battery modules connected in series and parallel in the solar battery array is appropriately set in accordance with the allowable input voltage of the inverter 107 or the allowable voltage or current of the wires of the direct current circuit.

The system 110 need not always be a commercial electric power system. It may be a non-utility alternating current power generation facility in a factory or the like.

When the inverter 107 is connected to the system, the system voltage detector 111 detects the system voltage and sends a signal representing the system voltage to the control circuit 104. When the system is not connected to the output connector 106, and the detected system voltage value is almost 0, the control circuit 104 turns off the switch 108.

Figure 4:
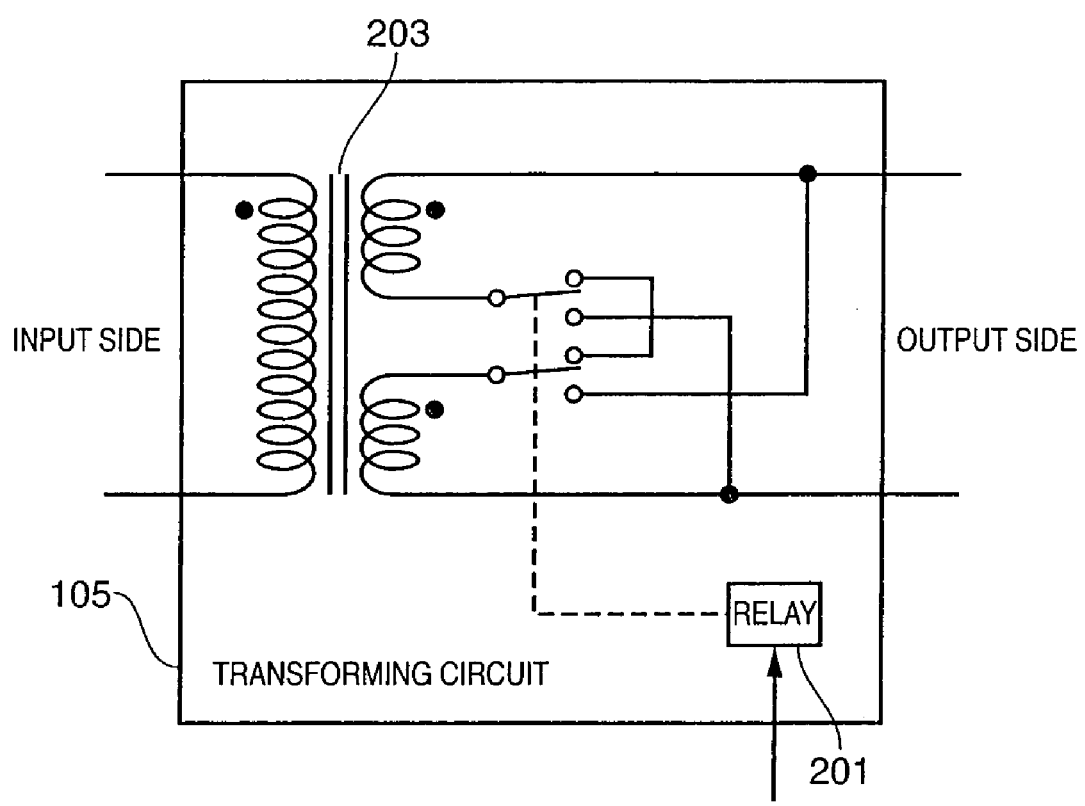
FIG. 4 is a block diagram showing the detailed arrangement of a transforming circuit of the first example.

When the system is connected to the output connector 106, and a system voltage of 200 V is detected, the control circuit 104 sends a signal to a relay 201 in the transforming circuit 105 whose detailed arrangement is shown in FIG. 4 so as to connect two secondary windings of a transformer 203 in series and then turns on the switch 108 at an appropriate timing. As a result, the inverter 107 operates in an interconnected operation mode for outputting alternating current power of 200 V.

On the other hand, a system voltage of 100 V is detected, the control circuit 104 sends a signal to the relay 201 to connect the two secondary windings of the transformer 203 in parallel and then turns on the switch 108 at an appropriate timing. As a result, the inverter 107 operates in an interconnected operation mode for outputting alternating current power of 100 V.

That is, since the control circuit 104 switches the setting of the transforming circuit 105 in accordance with the detected system voltage, the inverter 107 operates in the interconnected operation mode for outputting alternating current power of 200 V or 100 V in accordance with the system voltage. Note that the control circuit 104 not only switches the setting of the transforming circuit 105 in accordance with the detected system voltage but also switches the set value of the detection voltage of an overvoltage protecting circuit (not shown).

Although the use efficiency of the transformer becomes low, the transformer 203 having a 100-V tap may be used to extract power from both ends of the secondary windings when the system voltage is 200 V or to extract power from the 100-V tap when the system voltage is 100 V.

As described above, the inverter 107 of the first example detects a system voltage and outputs alternating current power having a voltage corresponding to the system voltage. Hence, a plurality of kinds of inverters corresponding to system voltages need not be prepared.

Second Example

Figure 5:
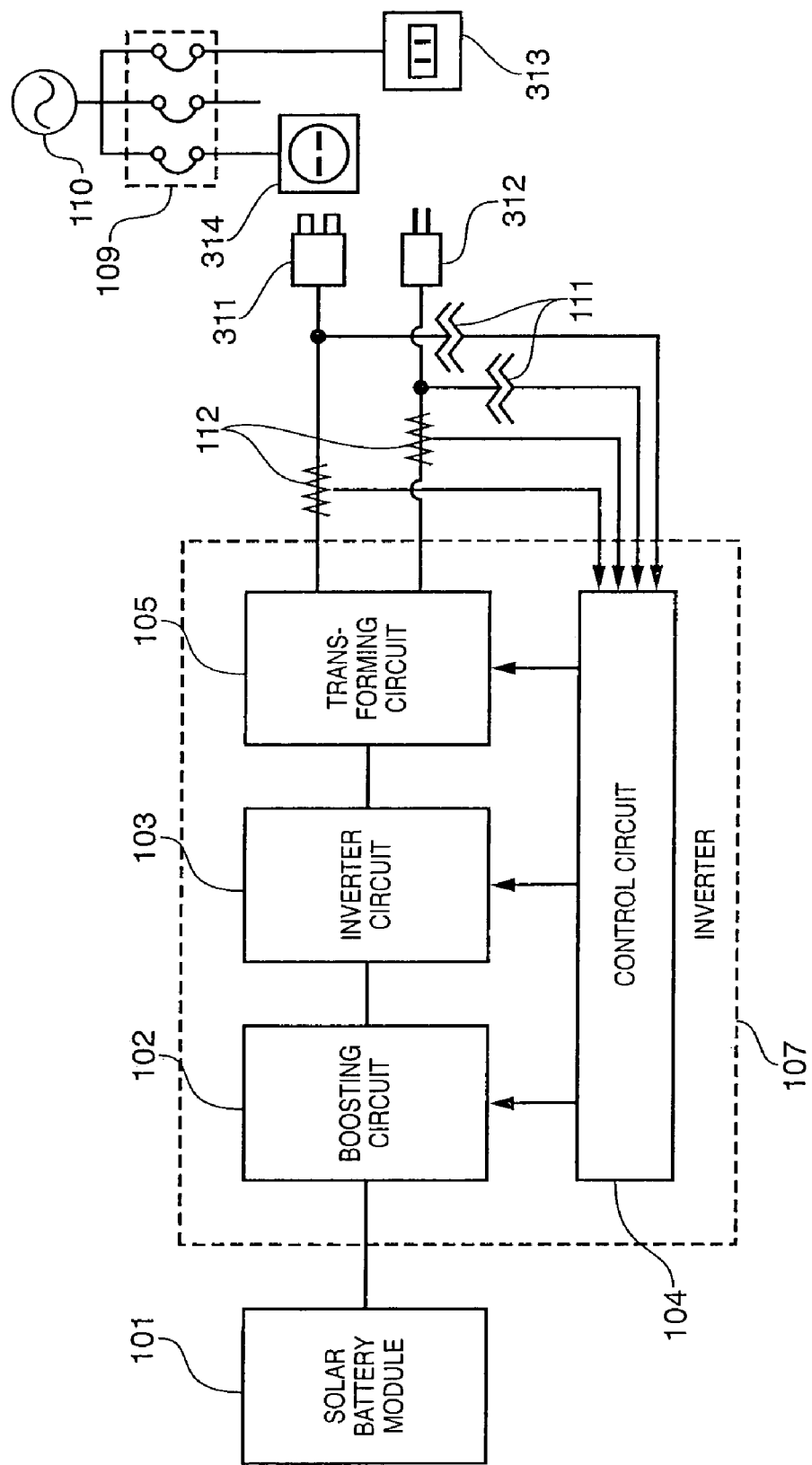
FIG. 5 is a block diagram showing the arrangement of a solar power generation apparatus of the second example.

FIG. 5 is a block diagram showing the arrangement of a solar power generation apparatus of the second example. An inverter 107 of the second example has an output cable with a 200-V plug 311 attached to its distal end and an output cable having a 100-V plug 312 attached. The plugs 311 and 312 can be connected to 200-V and 100-V wall sockets 314 and 313 corresponding to the shapes of the plugs.

Figure 6:
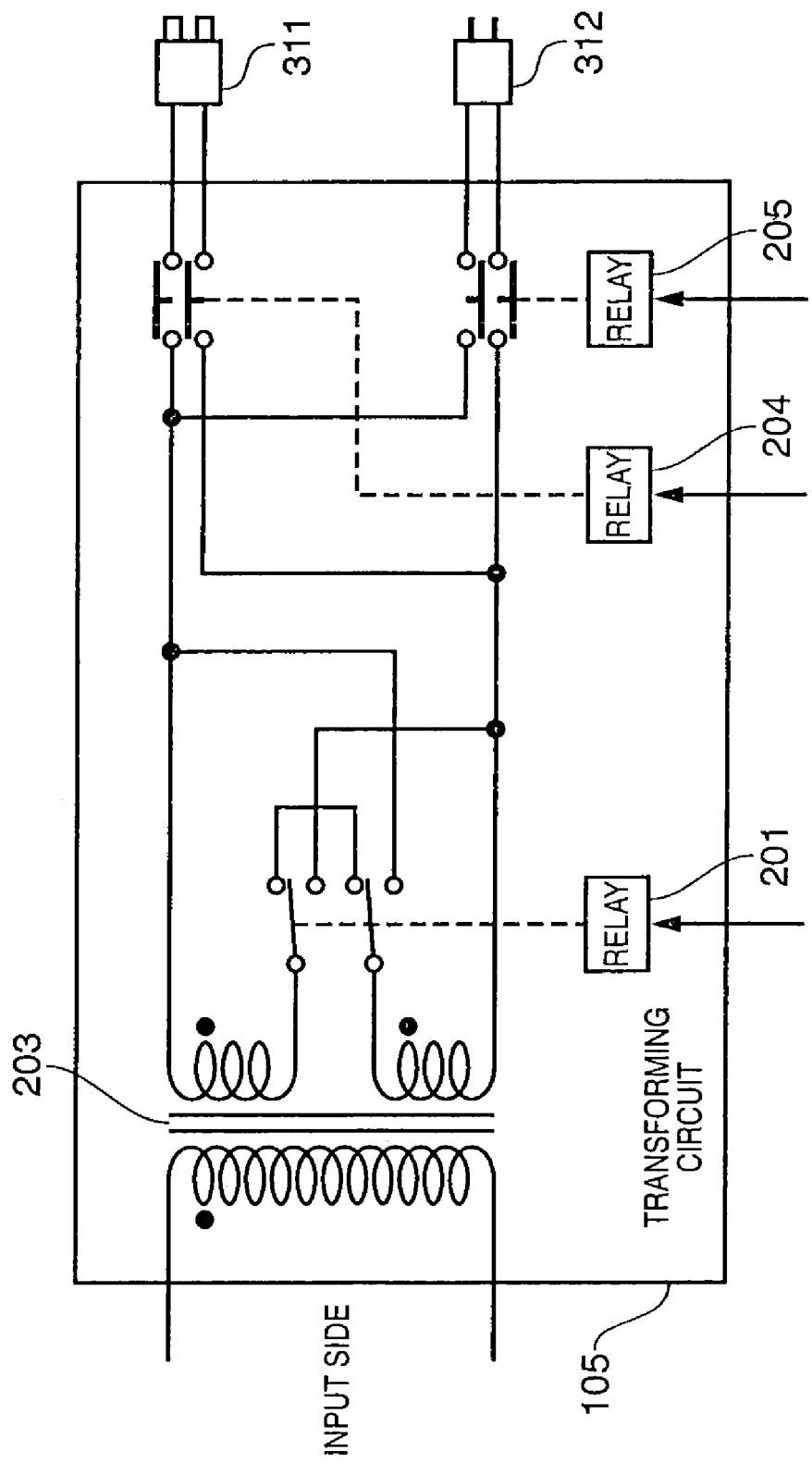
FIG. 6 is a block diagram showing the detailed arrangement of a transforming circuit of the second example.

FIG. 6 is a block diagram showing the arrangement of a transforming circuit 105. Relays 204 and 205 for connecting/disconnecting lines to be connected to the plugs 311 and 312 are added to the arrangement of the transforming circuit 105 of the first example shown in FIG. 4. The contacts of the relays 204 and 205 also serve as the switch 108 of the first example.

When detection values from voltage detectors 111 for detecting the voltages of the lines of the plugs 311 and 312 are almost 0 V, a control circuit 104 turns off both the relays 204 and 205.

When the plug 311 is connected to the corresponding wall socket 314, and a system voltage of 200 V is detected, the control circuit 104 sends a signal to a relay 201 to connect two secondary windings of a transformer 203 in series and then sends a signal to the relay 204 to connect the line for the plug 311 at an appropriate timing. As a result, the inverter 107 operates in an interconnected operation mode for outputting alternating current power of 200 V.

On the other hand, when the plug 312 is connected to the corresponding wall socket 313, and a system voltage of 100 V is detected, the control circuit 104 sends a signal to the relay 201 to connect two secondary windings of the transformer 203 in parallel and then sends a signal to the relay 205 to connect the line for the plug 312 at an appropriate timing. As a result, the inverter 107 operates in an interconnected operation mode for outputting alternating current power of 100 V.

When one of the relays 204 and 205 is being driven to connect the line, the control circuit 104 does not drive the other relay.

The control circuit 104 always monitors a current flowing to a line by a current detector 112. When the current flowing to the line has a predetermined value or less, drive of the relay 204 or 205 is immediately canceled to disconnect the line. This is because when the plug 311 or 312 is removed from the socket, an electrical shock accident may occur.

Alternatively, when the voltage detector 111 detects an abnormality of the line voltage, drive of the relay 204 or 205 is canceled to disconnect the line. That is, in a system interconnection inverter, a power outage detection function by a protecting unit described in the "system interconnection technology operation guideline" acts, and the operation can be safely stopped.

The settling values and settling times are arbitrarily set in accordance with the system to be connected to each line.

In addition, to prevent any short circuit when the plugs 311 and 312 are simultaneously connected to the wall sockets or to prevent any electrical shock accident by an unconnected plug, the voltage detector 111 and current detector 112 must be insulated from the main circuit.

When the plugs 311 and 312 are simultaneously connected to the wall sockets, the control circuit 104 preferentially sets the 200-V output. However, the 100-V output may be preferentially set.

Although not illustrated, the inverter 107 may have an output socket in the isolated operation mode. In this case, upon detecting power outage, the control circuit 104 outputs a gate off signal to a boosting circuit 102 and inverter circuit 103 and cancels drive of the relay 204 or 205 to disconnect the inverter 107 from a system 110. After that, the inverter circuit 103 is switched to the isolated operation mode and cancels the gate off signal. With this operation, alternating current power can be obtained from the output socket. Hence, even when power outage takes place due to disasters or the like, the solar power generation apparatus (at least the inverter 107) can be installed at an arbitrary position to supply the alternating current power to various loads.

As described above, the inverter 107 of the second example detects a system voltage and outputs alternating current power having a voltage corresponding to the system voltage, as in the first example. Hence, a plurality of kinds of inverters corresponding to system voltages need not be prepared. In addition, the solar power generation apparatus can easily be connected to the system 110 through the plug 311 or 312 to perform interconnected operation. In an emergency, the solar power generation apparatus can be installed at an arbitrary position and used as an emergency power supply.

In the example shown in FIG. 5, the two plugs 311 and 312 are connected. However, as in the first example, an output connector 106 may be arranged at the output terminal of the inverter 107 such that only a cable having a necessary plug at its distal end can be connected. In this arrangement, since the voltage and current need not be detected for each of the lines connected to the two plugs 311 and 312, only a set of single voltage detector 111 and current detector 112 suffices. In addition, one of the relays 204 and 205 of the transforming circuit 105 can be omitted.

Third Example

Figure 7:
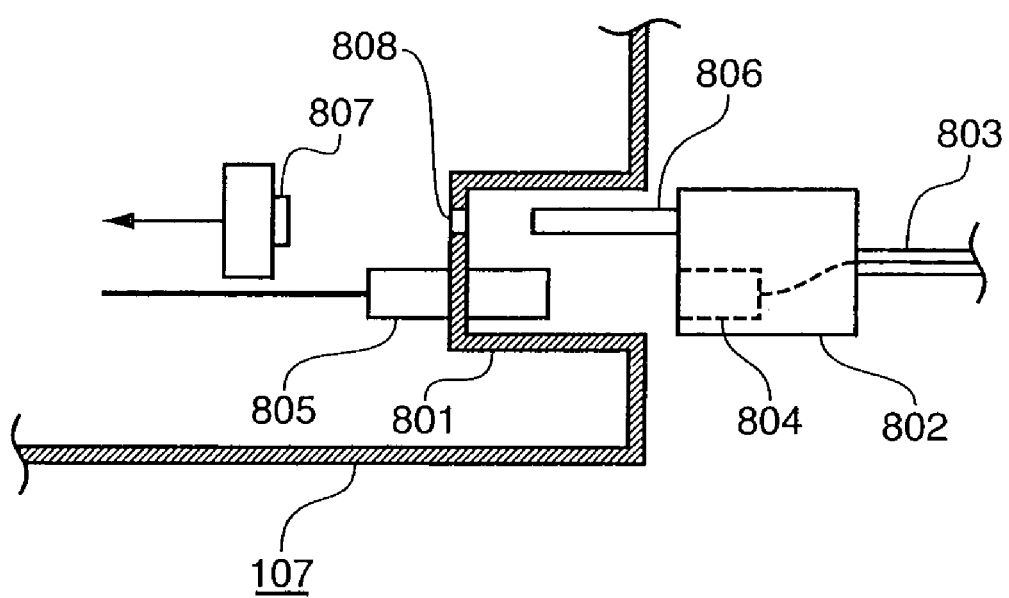
FIG. 7 is a view for explaining the output connector (receptacle) of an output terminal of an inverter of the third example.

An inverter 107 of the third example has at its output terminal an output connector (receptacle) 801 for receiving a plug 802 as shown in FIG. 7. The shape of the plug 802 is discriminated as A, B, B3, BF, C, O, or SE. The plug 802 having a shape corresponding to the region where the solar power generation apparatus is used or a voltage desired by the user is used. The inverter 107 outputs a voltage corresponding to the shape of the plug 802, and details will be described later.

The receptacle 801 has at its bottom portion an opening 808 through which a projection 806 of the plug 802 can extend. The projection 806 extending through the opening 808 turns on a switch 807. When the switch 807 is ON, a control section 104 determines that the plug 802 for, e.g., 200 V is connected.

Electrodes 805 and 804 for power can fit each other. When the plug 802 is inserted into the receptacle 801, the inverter 107 is connected to a system 110 through a cable 803.

Figure 8:
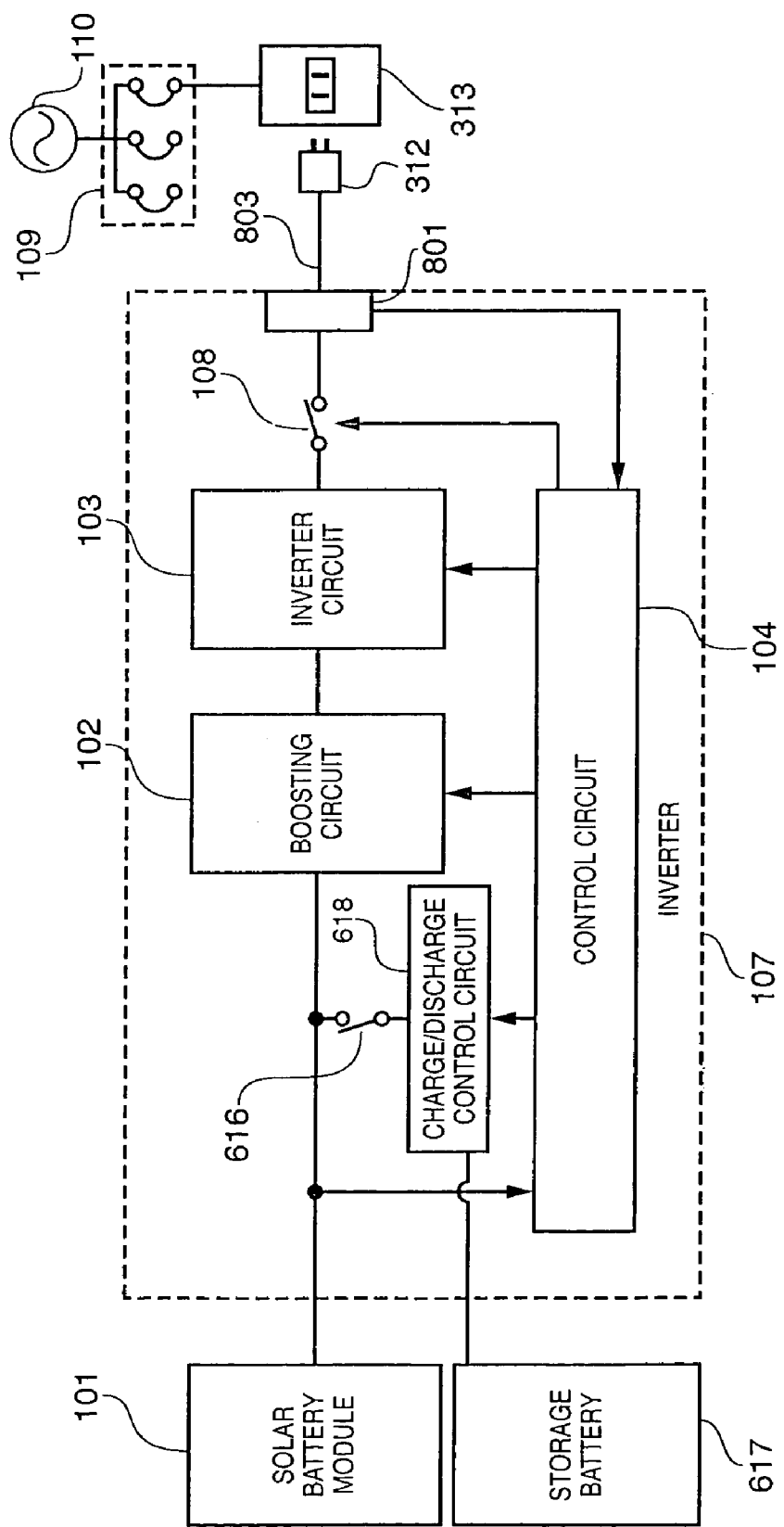
FIG. 8 is a block diagram showing the arrangement of a solar power generation apparatus of the third example.

FIG. 8 is a block diagram showing the arrangement of a solar power generation apparatus of the third example.

When the plug 802 connected to the receptacle 801 is for 100 V, the control circuit 104 controls the output voltage of a boosting circuit 102 to the first target value (e.g., 160 V) and sets an inverter circuit 103 in an interconnected operation mode for 100-V output. When the plug 802 is for 200 V, the control circuit 104 controls the output voltage of the boosting circuit 102 to the second target value (e.g., 320 V) and sets the inverter circuit 103 in an interconnected operation mode for 200-V output.

To change the voltage, the inductance of an inductor 5 shown in FIG. 1 or a system interconnection reactor (not shown) is changed as needed, though a detailed description thereof will be omitted. The operation of a switch 108 is the same as in the first example. Although not illustrated in FIG. 8, the solar power generation apparatus also has a voltage detector or current detector. When the voltage indicated by the plug 802 is different from the voltage of the system 110 or when a plug 312 is removed, the control circuit 104 turns off the switch 108. As in the first example, a transforming circuit 105 may be used to change the voltage.

The inverter 107 shown in FIG. 8 also has a storage battery 617 for supplying direct current power at night or when a solar battery module 101 cannot be connected, a charge/discharge control circuit 618 for controlling charge and discharge of the storage battery 617, and a switch 616 for making/breaking connection between the solar battery module 101 and the storage battery 617. The storage battery 617 can be arranged either in or outside the inverter 107. In the isolated operation mode, if the output of the solar battery module 101 is less than a predetermined voltage at night or due to weak sunlight, and a decrease in output of the solar battery module 101 is detected, the control circuit 104 turns on the switch 616 to cause the charge/discharge control circuit 618 to supply power from the storage battery 617.

As described above, according to the inverter of the third example, the system voltage can be known from the shape of the plug connected to the inverter 107, and alternating current power having a voltage corresponding to the system voltage is outputted. Hence, a plurality of kinds of inverters corresponding to system voltages need not be prepared. In addition, as in the second example, the solar power generation apparatus can easily be connected to the system 110 through the plug 311 or 312 to perform interconnected operation. Furthermore, in an emergency, the solar power generation apparatus can be installed at an arbitrary position together with the storage battery 617 and effectively used as an emergency power supply.

When the solar power generation apparatus according to the above-described first embodiment is used, the following effects can be expected.

(1) Since the inverter of this embodiment detects the system voltage and outputs alternating current power with an appropriate voltage, interconnected operation can easily be performed.

(2) Since the inverter of this embodiment outputs, e.g., 100-V or 200-V alternating current power in correspondence with a system voltage, a plurality of inverters corresponding to system voltages to be connected need not be manufactured and prepared.

(3) Since the inverter of this embodiment can be connected to a system in a normal state or moved to an arbitrary position in an emergency, it can be effectively used as an emergency power supply.

(4) The inverter of this embodiment can easily be connected to a wall socket in a building or the like without using any special connection and can also easily be connected to a system or supply power in an emergency. In addition, even when the plug is removed from the wall socket or inappropriate connection is made, operation can be performed in consideration of safety.

In the above description, system voltages of 100 V and 200 V have been exemplified. However, the solar power generation apparatus can be cope with various system voltages in various regions.

When the solar power generation apparatus or inverter of this embodiment is used as an emergency power supply, the output switch of the inverter is not turned on in some cases due to, e.g., the absence of a system, though a detailed description thereof will be omitted. In consideration of this case, a switch for switching the operation of the control circuit 104 to an emergency power supply operation mode is preferably arranged. With this switch, an operation mode such as "normal", "emergency 100-V output", or "emergency 200-V output" can be set.

Normally, in consideration of, e.g., removal of the plug from the wall socket, when the output current value is a predetermined value or less, the output switch of the inverter is turned off. In an emergency, the output current value at which the output switch is turned off is made smaller in consideration of a variation in load.

Second Embodiment

A solar power generation apparatus according to the second embodiment of the present invention will be described below in detail with reference to the accompanying drawings. The same reference numerals as in the first embodiment denote the same parts in the second embodiment, and a detailed description thereof will be omitted.

[Switch]

Switches of the second embodiment are formed from electromagnetic switches or breakers and inserted between the inverter and the first output section, between the second output section and a branch point between the inverter and the first output section, and in a panel board between the first output section and a system. Of these switches, a mechanical switch is turned off when the switch itself is OFF, and turned on when the switch itself is ON (or a reverse logic may be used). An electromagnetic switch is turned on/off upon receiving a signal from a control circuit 104.

[Plug Unit]

A plug unit 501 of the second embodiment has a function of switching from interconnected operation to isolated operation and/or a function of determining an alternating current voltage to be outputted from the output section of the inverter when inserted to the output section.

Figure 13:
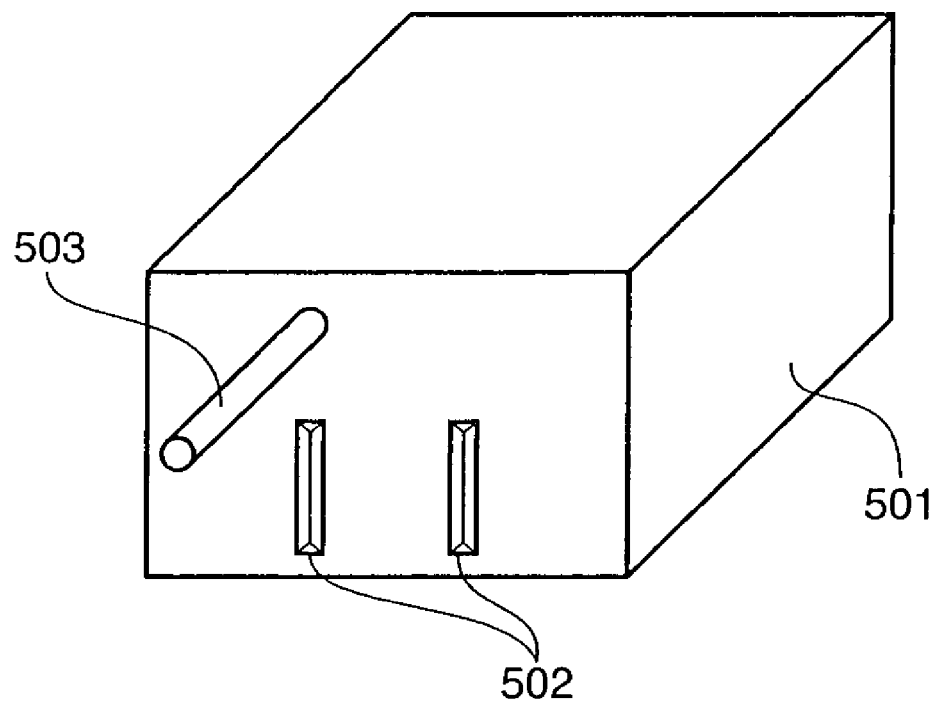
FIG. 13 is a view for explaining a plug unit.

The plug unit 501 has an electrode receiving portion 502 having a shape connectable to the electrode of the output section, a projection 503 for turning on an isolated operation start switch, and an electrode receiving portion 504 (FIG. 14) capable of receiving the plug of a load, as shown in FIG. 13. The shape, number, and layout of projections can be changed.

Figure 14:
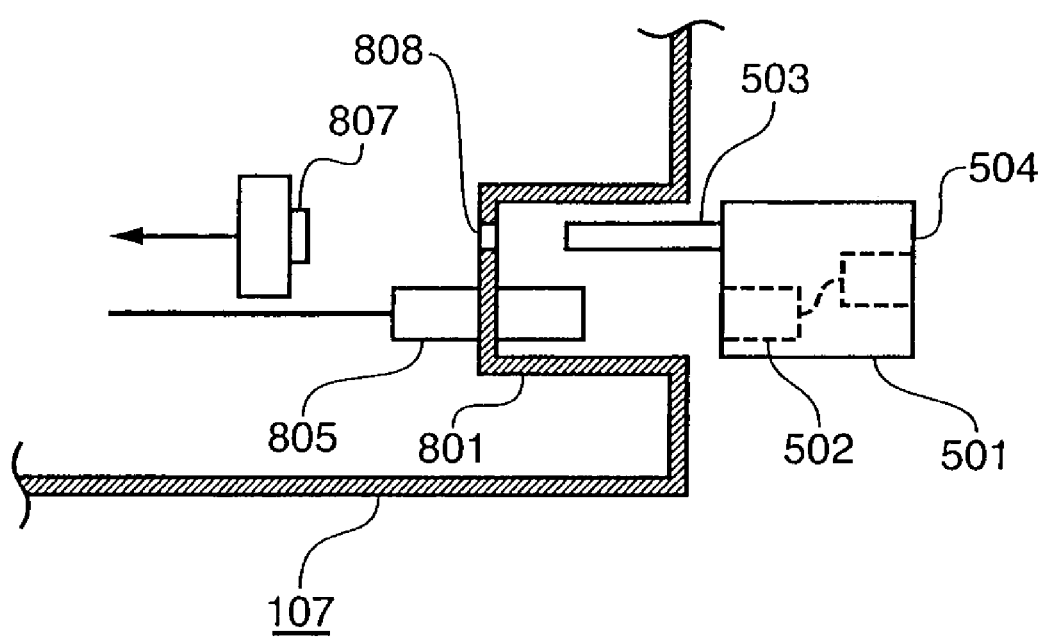
FIG. 14 is a view showing the arrangement of an output section.

When the plug unit 501 is inserted into an output section 801 of the inverter, as shown in FIG. 14, the electrode receiving portion 502 of the plug unit 501 is connected to an electrode 805 of the output section 801 of the inverter. The projection 503 projecting from the plug unit 501 turns on an isolated operation start switch 807 through a hole 808 formed at the output section 801 so as to allow the inverter to execute isolated operation.

After the electrodes are safely and surely connected, the projection 503 turns on the isolated operation start switch 807. With this design, safety can be ensured because the inverter outputs no voltage until the plug unit 501 is completely inserted independently of the shape of the electrode of the output section 801 or the shape of the electrode receiving portion 502.

A desired output voltage corresponding to the plug unit 501 can be generated, and when the plug of a load to be operated is connected to the electrode receiving portion 504 of the plug unit 501, the load can be operated.

For the plug unit 501 and the output section 801 of the inverter, the shapes of the electrode and projection are not limited to those shown in FIGS. 13 and 14.

The shape of the electrode receiving portion is discriminated as A, B, B3, BF, C, O, or SE in accordance with a region where the inverter is used, a voltage desired by the user, or a load to be used. When the plug unit 501 having an electrode receiving portion with one of the above shapes, the inverter outputs alternating current power corresponding to that shape.

Figure 15:
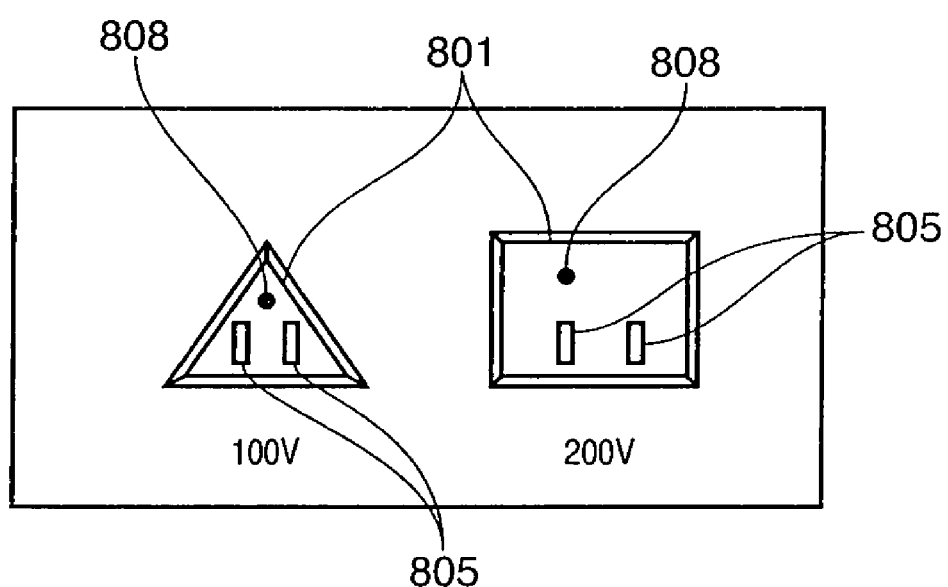
FIG. 15 is a view showing another arrangement of the output section.

The plug unit 501 can have any shape such as a circular, triangular, or rectangular shape (FIG. 15). The outer shape can be changed in accordance with the region where the inverter is used or the voltage desired by the user. When the plug unit 501 having such a shape is inserted, the inverter outputs alternating current power corresponding to the outer shape.

Figure 16:
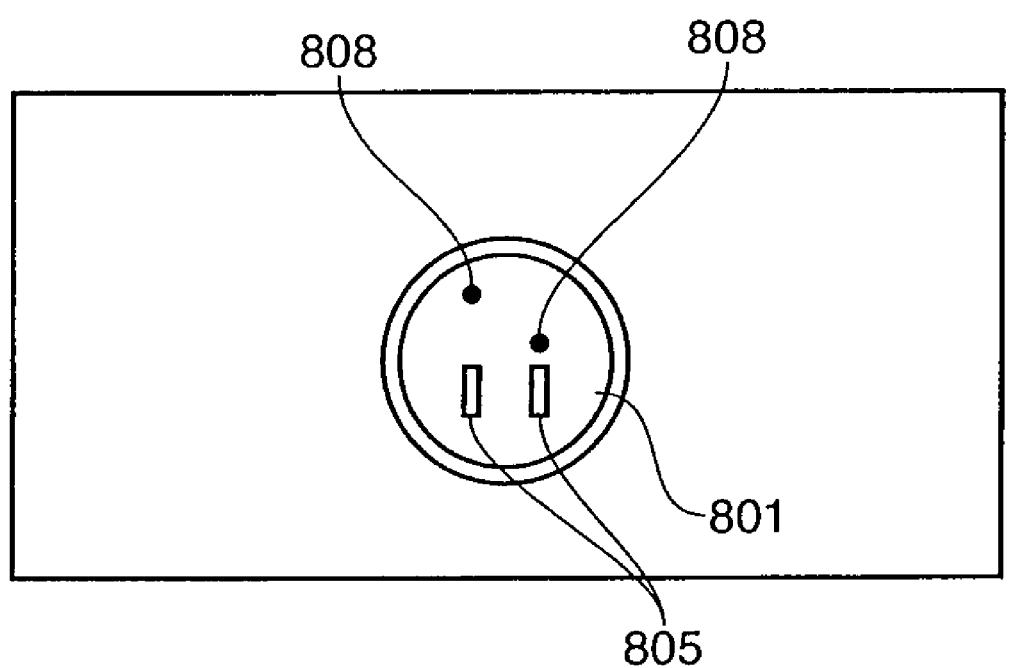
FIG. 16 is a view showing still another arrangement of the output section.

For an AC module having an inverter attached to the lower surface of a solar battery module, if the inverter need be made compact, the inverter preferably has a single output section 801. In this case, as shown in FIG. 16, it is preferable to prepare in the single output section 801 a hole 808 and switch corresponding to the first target output voltage and a hole 808 and switch corresponding to the second target output voltage such that the single output section 801 can output one of a plurality of different output voltages upon receiving a plug unit 501 corresponding to the output voltage.

Fourth Example

Figure 9:
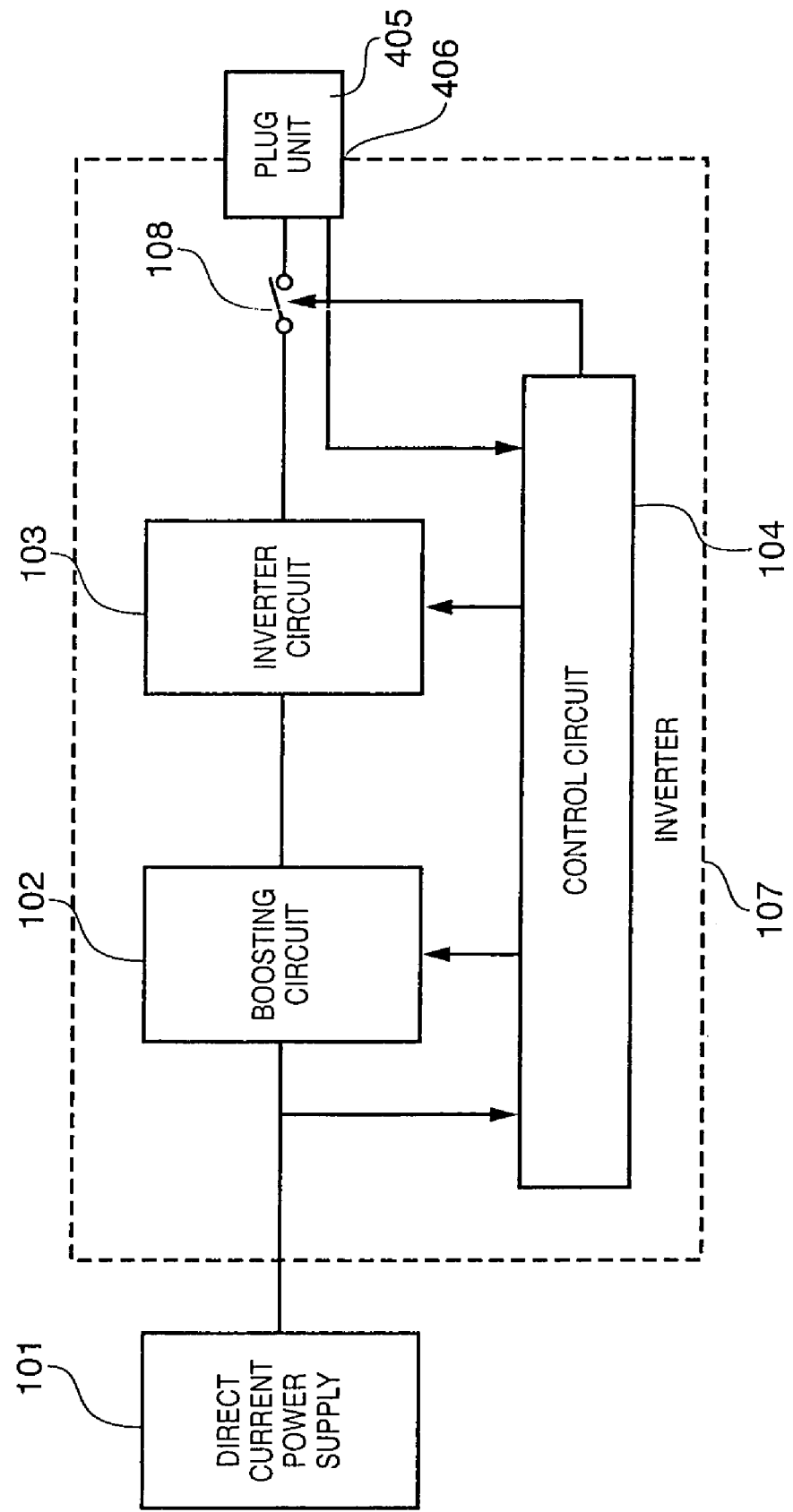
FIG. 9 is a block diagram showing the arrangement of a solar power generation apparatus of the fourth example.

FIG. 9 is a block diagram showing the arrangement of a solar power generation apparatus of the fourth example. In the fourth example, interconnected operation is not performed, and power is supplied only to a load.

Referring to FIG. 9, reference numeral 101 denotes a direct current power supply; 102, a boosting circuit; 103, an inverter circuit; 104, a control circuit; 405, a plug unit; 406, an output section; 107, an inverter; and 108, a switch.

Two solar battery modules PV-MR140 (140 W, 19.6 V, 7.15 A) available from Mitsubishi Electric are connected in series to construct a power supply for power of about 280 W with a rated output voltage of 39.2 V and a current of 7.15 A. The numbers of series- and parallel-connected modules in the array are not particularly limited and are appropriately selected in accordance with the voltage of the inverter 107 and the current imputable range.

As shown in FIG. 15, the output section 406 has two output sections for 100 V and 200 V.

When the solar power generation apparatus of the fourth example is connected to a load of 200 V, the plug unit 405 for 200 V is inserted into the 200-V output section. Hence, as shown in FIG. 14, a projection 503 of a plug unit 501 is inserted into a hole 808 of a 200-V output section 801, and an operation start switch (isolated operation start switch) 807 is turned on through the hole 808.

The control circuit 104 sends a control signal corresponding to the type of the plug unit 405 to control the output voltage of the boosting circuit 102 to the preset first target output voltage of 320 V. The control circuit 104 further sends a control signal to cause the inverter circuit 103 to output a voltage of 200 V so that alternating current power of about 200 V is outputted from the inverter 107.

When the solar power generation apparatus of the fourth example is connected to a load of 100 V, the plug unit 405 for 100 V is inserted into the 100-V output section. Like the case of the 200-V load, and the output voltage of the boosting circuit 102 is controlled to the preset second target output voltage of 160 V. The inverter circuit 103 is controlled to output a voltage of 100 V so that alternating current power of about 100 V is outputted from the inverter 107.

As described above, when the plug unit 405 corresponding to the voltage of a load to be connected is inserted into the output section 406, a desired output voltage can be extracted from the inverter 107. The inverter 107 can be made compact and the desired output voltage can easily be obtained without converting the output voltage using a transformer or the like.

Fifth Example

Figure 10:
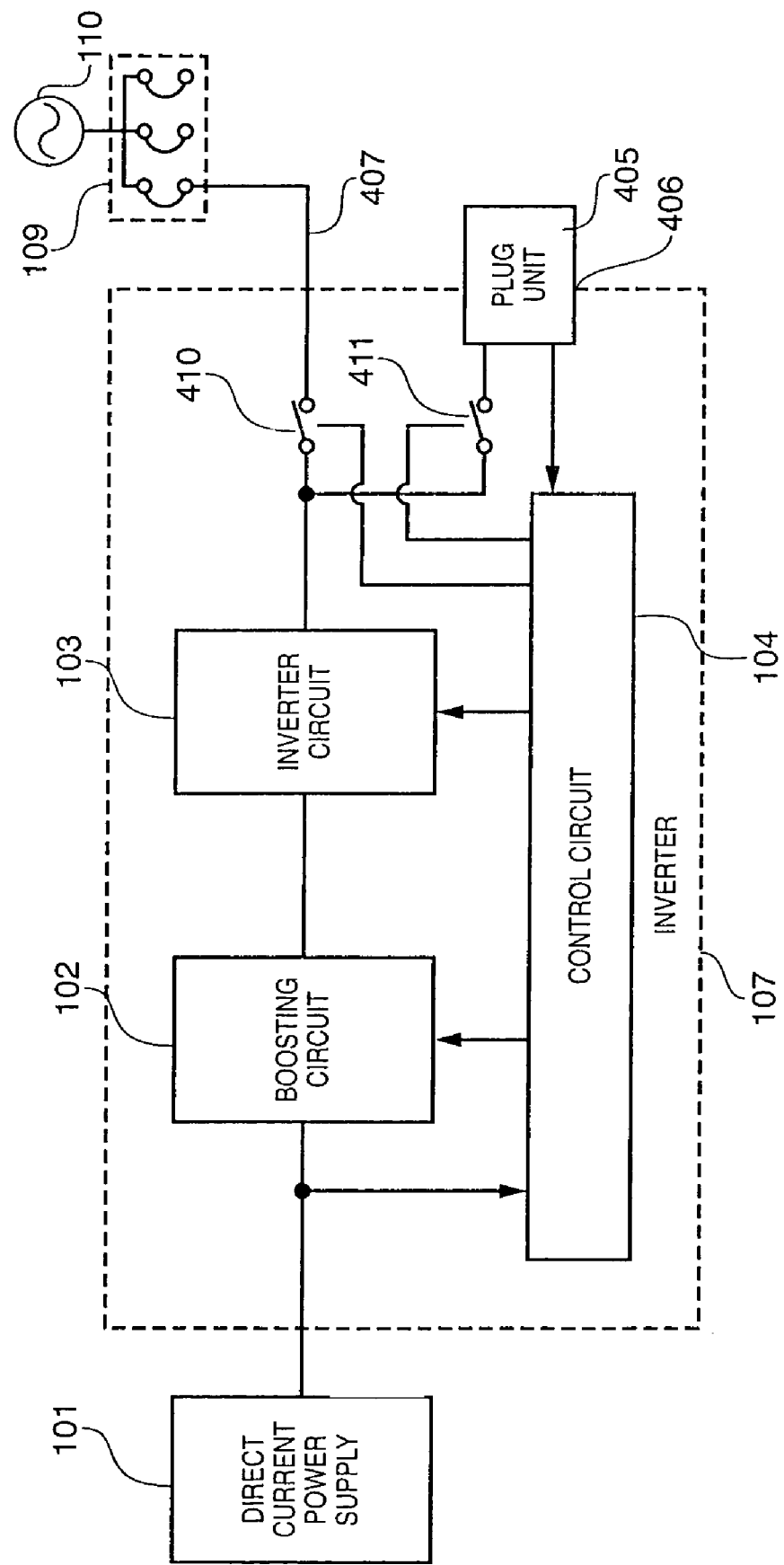
FIG. 10 is a block diagram showing the arrangement of a solar power generation apparatus of the fifth example.

FIG. 10 is a block diagram showing the arrangement of a solar power generation apparatus of the fifth example. The same reference numerals as in the fourth example denote the same parts in the fifth example, and a detailed description thereof will be omitted.

Referring to FIG. 10, reference numeral 407 denotes a first output section; 410, a switch inserted between an inverter circuit 103 and the first output section 407; and 411, a switch inserted between the inverter circuit 103 and a second output section 406.

As a direct current power supply 101, a power supply for power of about 5 kW with a rated output voltage of 235.2 V and a current of 21.45 A is constructed using an array in which 12×3 solar battery modules PV-MR140 described above are connected in series and parallel. The numbers of series- and parallel-connected modules in the array are not particularly limited and are appropriately selected in accordance with the voltage of an inverter 107 and the current inputtable range.

The first output section 407 of the solar power generation apparatus of the fifth example is connected to a single-phase three-wire 200-V system 110. In accordance with a control signal from a control circuit 104, a boosting circuit 102 operates such that its output voltage becomes the preset first target output voltage of 320 V. In accordance with a control signal from the control circuit 104, the inverter circuit is controlled to output a voltage of 200 V. Alternating current power of about 200 V is outputted from the inverter 107 and supplied to the load or system 110.

When a power outage detector (not shown) detects power outage on the basis of the output of the inverter 107 or a current flowing to the system 110, the control circuit 104 outputs a gate off signal to the boosting circuit 102 and inverter circuit 103 and also turns off the switch 410 to disconnect the inverter 107 from the system 110.

To make the inverter 107 execute isolated operation at the time of power outage, a plug unit 405 is inserted into the second output section 406. Upon receiving a signal representing insertion of the plug unit 405, the control circuit 104 switches the inverter 107 to the isolated operation mode. That is, the control circuit 104 turns on the switch 411 to connect the second output section 406 and inverter circuit 103. In this case, the switch 411 may be a switch that can be manually turned on.

When the plug unit 405 for 100 V is inserted into the second output section 406, the control circuit 104 performs control such that the output voltage of the boosting circuit 102 becomes the preset second target output voltage of 160 V, and the inverter circuit 103 outputs a voltage of 100 V. Alternating current power of about 100 V is outputted from the second output section 406 of the inverter 107.

If isolated output is necessary due to a reason other than power outage, the plug unit 405 for a desired voltage is inserted into the second output section 406. The inverter 107 is switched to the isolated operation mode, and a desired voltage corresponding to the load to be used can be obtained.

As described above, when the plug unit 405 is inserted into the second output section 406, a desired output voltage can be extracted from the inverter 107. The inverter 107 can be made compact and the desired output voltage can easily be obtained without converting the output voltage using a transformer or the like.

Sixth Example

Figure 11:
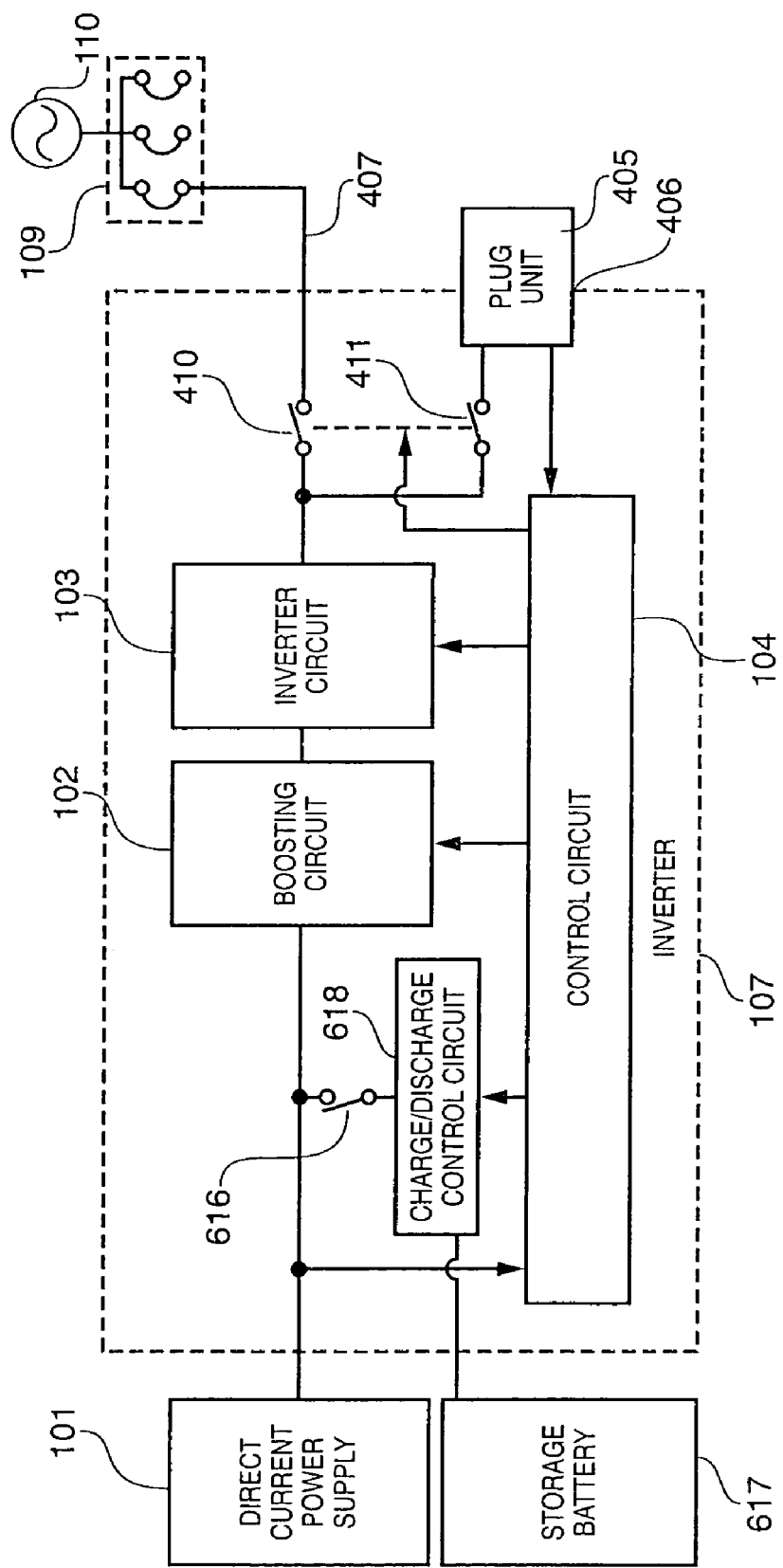
FIG. 11 is a block diagram showing the arrangement of a solar power generation apparatus of the sixth example.

FIG. 11 is a block diagram showing the arrangement of a solar power generation apparatus of the sixth example. The same reference numerals as in the fourth or fifth example denote the same parts in the sixth example, and a detailed description thereof will be omitted.

As a direct current power supply 101, the same arrangement as in the fourth example is used, though the present invention is not limited to this. In the sixth example, a storage battery 617 is arranged outside an inverter 107, though it may be incorporated in the inverter 107.

As in the fifth example, a control circuit 104 controls a boosting circuit 102 and inverter circuit 103 in accordance with a plug unit 405 inserted into a second output section 406.

If the output voltage of the direct current power supply 101 does not exceed a predetermined value, the control circuit 104 detects a decrease in output of the direct current power supply 101, turns on a switch 616, and sends a signal to a charge/discharge control circuit 618 such that power stored in the storage battery 617 can be used.

The same effects as in the fifth example can be expected. In addition, since both the direct current power supply 101 and storage battery 617 are used, the solar power generation apparatus can be more effectively used as an emergency power supply.

Seventh Example

Figure 12:
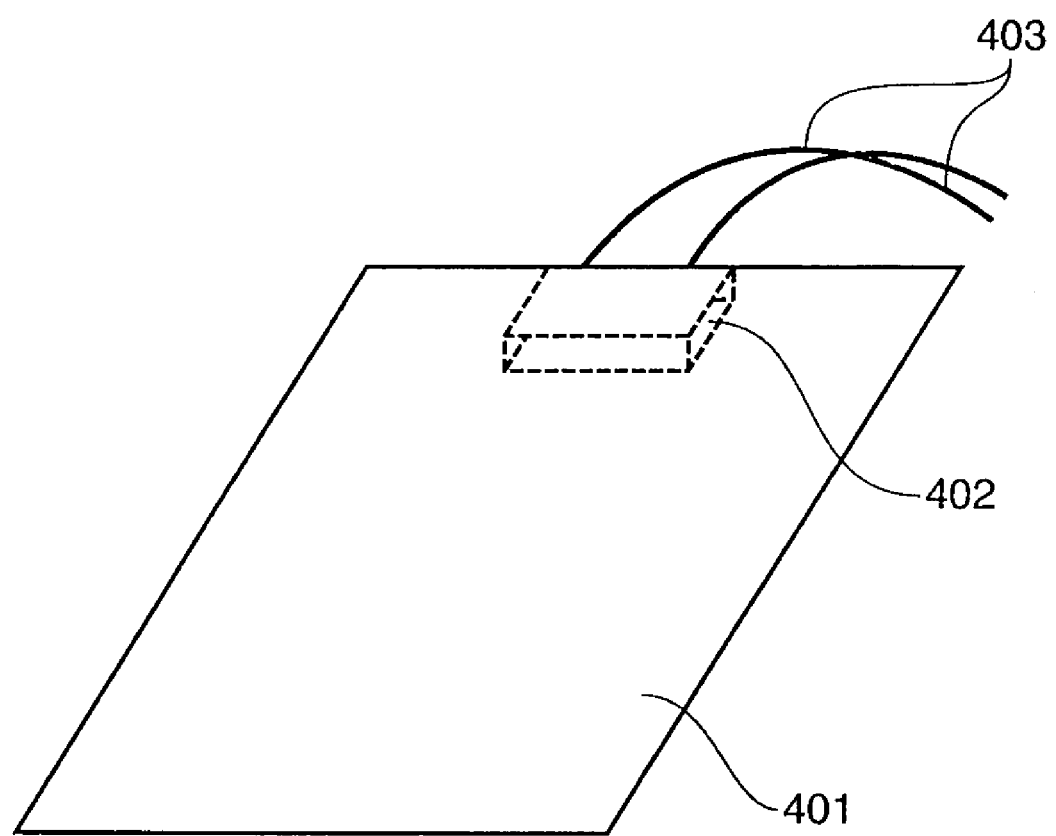
FIG. 12 is a view showing the outer appearance of an AC module using an inverter of the seventh example.

FIG. 12 is a view showing the outer appearance of an AC module using an inverter of the seventh example.

Referring to FIG. 12, reference numeral 401 denotes a solar battery module; 402, an inverter; and 403, an output cable.

A module that is the same as in the fourth example is used as the solar battery module 401. However, the present invention is not limited to this.

The output cable 403 of the AC module is connected to the neutral line and one power line of the lines of a single-phase three-wire 200-V system. The internal control circuit executes control such that the output voltage of the internal boosting circuit becomes the present first target output voltage of 160 V, and the internal inverter circuit outputs a voltage of 100 V. Hence, alternating current power of about 100 V can be obtained from the inverter 402.

If power outage occurs due to an earthquake or the like and is detected on the basis of the output of the inverter 402 or the current flowing between the system and the AC module, the inverter 402 and system are electrically disconnected. In this case, the AC module is caused to execute isolated operation described in the fifth and sixth examples at that position or at a remote position such as a place of refuge, thereby supplying alternating current power to a load.

As described above, when a plug unit 405 is switched in accordance with a load, alternating current power with a desired voltage can be extracted from the AC module. Hence, the same effects as in the fifth and sixth examples can be expected, and the AC module can be effectively used as an emergency power supply.

According to the above-described second embodiment, the following effects can be expected.

(1) A desired output voltage can easily be extracted by switching means.

(2) The output voltage need not be converted using a transformer or the like, and the inverter can be made compact.

(3) When a plug unit corresponding to a load is inserted into the inverter, a desired voltage can easily be extracted.

(4) Especially, when the inverter of this embodiment is used for an AC module, it can be effectively used as an emergency power supply.

As many apparently widely different embodiments of the present invention can be made without departing from the spirit and scope thereof, it is to be understood that the invention is not limited to the specific embodiments thereof except as defined in the appended claims.

What is claimed is:

1. A power converting apparatus which is connected to an electric power system, said apparatus comprising:
    a converting circuit, arranged to convert direct current power to alternating current power;
    a transforming circuit, arranged to transform voltage outputted from said converting circuit;
    a switch, arranged to make/break connection between said transforming circuit and the electric power system;
    a detector, arranged to detect a line voltage of the electric power system; and
    a controller, arranged to control operation of said converting circuit and transforming circuit, and to control connection of said switch, based on the detected line voltage of the electric power system and a connection state between said apparatus and the electric power system,
    wherein the transforming circuit comprises a relay and a plurality of secondary windings, and
    wherein the controller sends a first signal to the relay to connect the plurality of secondary windings in parallel when the detected line voltage has a first predetermined value, and sends a second signal to the relay to connect the plurality of secondary windings in series when the detected line voltage has a second predetermined value.

2. The apparatus according to claim 1, wherein said controller controls the output voltage of said converting circuit in accordance with the detected line voltage.

3. The apparatus according to claim 1, wherein said controller controls transformation ratio of said transforming circuit in accordance with the detected line voltage.

4. The apparatus according to claim 1, further comprising:
    a booster circuit, arranged to boost voltage of the direct current power to be inputted to said converting circuit, and
    wherein said controller controls the voltage outputted by said booster circuit.

5. A power generating apparatus for generating electric power, comprising the power converting apparatus according to claim 1.

6. The apparatus according to claim 5, further comprising a solar battery.

7. The apparatus according to claim 1, wherein the first predetermined value is 100 V and the second predetermined value is 200 V.

8. A control method of a power converting apparatus, which is connected to an electric power system, having a converting circuit arranged to convert direct current power to alternating current power, a transforming circuit arranged to transform voltage outputted from the converting circuit, and a switch arranged to make/break connection between the transforming circuit and the electric power system, comprising the steps of:

detecting a line voltage of the electric power system and a connection state between the converting apparatus and the electric power system; and controlling operation of the converting circuit and the transforming circuit, and controlling connection of the switch, based on the detected line voltage and connection state, wherein the transforming circuit comprises a relay and a plurality of secondary windings, and wherein the controlling step comprises sending a first signal to the relay to connect the plurality of secondary windings in parallel when the detected line voltage has a first predetermined value, and sending a second signal to the relay to connect the plurality of secondary windings in series when the detected line voltage has a second predetermined value.

9. The method according to claim 8, wherein the first predetermined value is 100 V and the second predetermined value is 200 V.

* * * * *